(12) United States Patent
Hayakawa et al.

(10) Patent No.: US 12,587,810 B2
(45) Date of Patent: Mar. 24, 2026

(54) SERVER APPARATUS

(71) Applicant: SUBARU CORPORATION, Tokyo (JP)

(72) Inventors: Kazuhiro Hayakawa, Tokyo (JP); Ryota Nakamura, Tokyo (JP); Junichi Motoyama, Tokyo (JP); Tsukasa Mikuni, Tokyo (JP); Takuya Homma, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 334 days.

(21) Appl. No.: 18/448,405

(22) Filed: Aug. 11, 2023

(65) Prior Publication Data

US 2024/0089700 A1 Mar. 14, 2024

(30) Foreign Application Priority Data

Sep. 8, 2022 (JP) ................................. 2022-143324

(51) Int. Cl.
H04W 4/029 (2018.01)
H04W 4/40 (2018.01)
H04W 4/90 (2018.01)

(52) U.S. Cl.
CPC ............. H04W 4/029 (2018.02); H04W 4/40 (2018.02); H04W 4/90 (2018.02)

(58) Field of Classification Search
None
See application file for complete search history.

(56) References Cited

U.S. PATENT DOCUMENTS

| | | | |
|---|---|---|---|
| 11,682,290 B1 * | 6/2023 | Nave | B60W 30/0956 |
| | | | 340/539.13 |
| 11,720,971 B1 * | 8/2023 | Marlow | G06Q 40/08 |
| | | | 705/4 |
| 2011/0159839 A1 * | 6/2011 | Mcewen | H04W 76/50 |
| | | | 455/404.1 |
| 2015/0097703 A1 * | 4/2015 | Baur | G08G 1/096791 |
| | | | 340/902 |

(Continued)

FOREIGN PATENT DOCUMENTS

| | | |
|---|---|---|
| JP | 2001-93069 A | 4/2001 |
| JP | 2010-244167 A | 10/2010 |

*Primary Examiner* — Adolf Dsouza
(74) *Attorney, Agent, or Firm* — Rimon P.C.

(57) ABSTRACT

A server apparatus determines whether a vehicle without an emergency notification system is included in accident vehicles based on image data received from peripheral vehicles or peripheral portable devices. When the vehicle without the emergency notification system is included, the server acquires position data on a vehicle having issued an emergency notification. The server requests a base station covering the acquired position to send an information provision request to vehicles and portable devices present in a set target area. The server collects accident information from the peripheral vehicles and the peripheral portable devices, and collects information from the vehicles and the portable devices present in the set target area. The extractor extracts accident information from the information collected from the vehicles or the portable devices present in the set target area based on the position data. The server notifies an emergency notification center of the accident information collected or extracted.

10 Claims, 11 Drawing Sheets

(56) References Cited

U.S. PATENT DOCUMENTS

| 2022/0048522 A1* | 2/2022 | Hamagami | B60W 40/09 |
| 2022/0150681 A1* | 5/2022 | Kim | G07C 5/008 |
| 2022/0169175 A1* | 6/2022 | Choi | H04W 4/90 |
| 2022/0246035 A1* | 8/2022 | Garg | G07C 5/008 |
| 2023/0122572 A1* | 4/2023 | Choi | H04W 4/90 |
| | | | 455/404.1 |
| 2024/0242548 A1* | 7/2024 | Cordova | G07C 5/0816 |

* cited by examiner

SERVER APPARATUS

CROSS-REFERENCE TO RELATED APPLICATIONS

The present application claims priority from Japanese Patent Application No. 2022-143324 filed on Sep. 8, 2022, the entire contents of which are hereby incorporated by reference.

BACKGROUND

The disclosure relates to a server apparatus.

Various vehicle notification systems have been put into practical use that causes, when an emergency such as a traffic accident or a vehicle malfunction occurs, a mobile phone, an in-vehicle phone, or another in-vehicle communication device to send an emergency notification indicating the state of the emergency via a mobile communication network.

An example of the notification systems described above is disclosed in, for example, Japanese Unexamined Patent Application Publication (JP-A) No. 2010-244167. In order to inform an emergency center of details of a contact accident, an emergency notification system disclosed in JP-A 2010-244167 includes a pedestrian accident information sensor, an occupant accident information sensor, and an accident information transmission part. The pedestrian accident information sensor detects pedestrian accident information to determine a circumstance upon contact between a pedestrian and a vehicle. The occupant accident information sensor detects occupant accident information to determine a circumstance upon occurrence of danger to an occupant due to contact of the vehicle. When detecting contact with the pedestrian, the accident information transmission part sends the pedestrian accident information to a communication device of the emergency center. When determining the occurrence of danger to the occupant, the accident information transmission part sends the occupant accident information to the communication device.

Another example of the notification systems is disclosed in, for example, JP-A No. 2001-93069. According to the notification system disclosed in JP-A No. 2001-93069, when an accident occurs outside a communication area of an in-vehicle mobile phone, emergency notification data is sent from an own vehicle to another vehicle in the communication area via a transceiver unit, and the other vehicle performs emergency notification in place of the own vehicle.

SUMMARY

An aspect of the disclosure provides a server apparatus including communicator, a determination unit, a position data acquisition unit, an information provision request unit, an information collector, an extractor, and a notification unit. The communicator is configured to, upon occurrence of an accident involving multiple vehicles, communicate with peripheral vehicles or portable devices present in a peripheral area of a site of the accident. The peripheral vehicles include the multiple vehicles. The determination unit is configured to determine whether a vehicle without an emergency notification system is included in the multiple vehicles based on image data received from the peripheral vehicles or the portable devices present in the peripheral area. The position data acquisition unit is configured to acquire position data on a position of a vehicle of the multiple vehicles, which has issued an emergency notification when the vehicle without the emergency notification system is included in the multiple vehicles involved. The information provision request unit is configured to request a base station covering an area including the position acquired by the position data acquisition unit to send an information provision request to vehicles or portable devices present in a set target area. The information collector is configured to collect accident information from the peripheral vehicles or the portable devices present in the peripheral area, and collect information from the vehicles or the portable devices present in the set target area. The extractor is configured to extract accident information from the information collected from the vehicles or the portable devices present in the set target area based on the position data included in the information collected from the vehicles or the portable devices present in the set target area. The notification unit is configured to notify an emergency notification center of the accident information collected by the information collector or the accident information extracted by the extractor as notification information.

A server apparatus includes a communicator and circuitry. The communicator is configured to, upon occurrence of an accident involving multiple vehicles, communicate with peripheral vehicles or portable devices present in a peripheral area of a site of the accident. The peripheral vehicles include the multiple vehicles. The circuitry is configured to: determine whether a vehicle without an emergency notification system is included in the multiple vehicles based on image data received from the peripheral vehicles or the portable devices present in the peripheral area; acquire position data on a position of a vehicle of the multiple vehicles, which has issued an emergency notification when the vehicle without the emergency notification system is included in the multiple vehicles; request a base station covering an area including the position acquired to send an information provision request to vehicles or portable devices present in a set target area; collect accident information from the peripheral vehicles or the portable devices present in the peripheral area; collect information from the vehicles or the portable devices present in the set target area; extract accident information from the information collected from the vehicles or the portable devices present in the set target area based on the position data included in the information collected from the vehicles or the portable devices present in the set target area; and notify an emergency notification center of the accident information collected or the accident information extracted as notification information.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
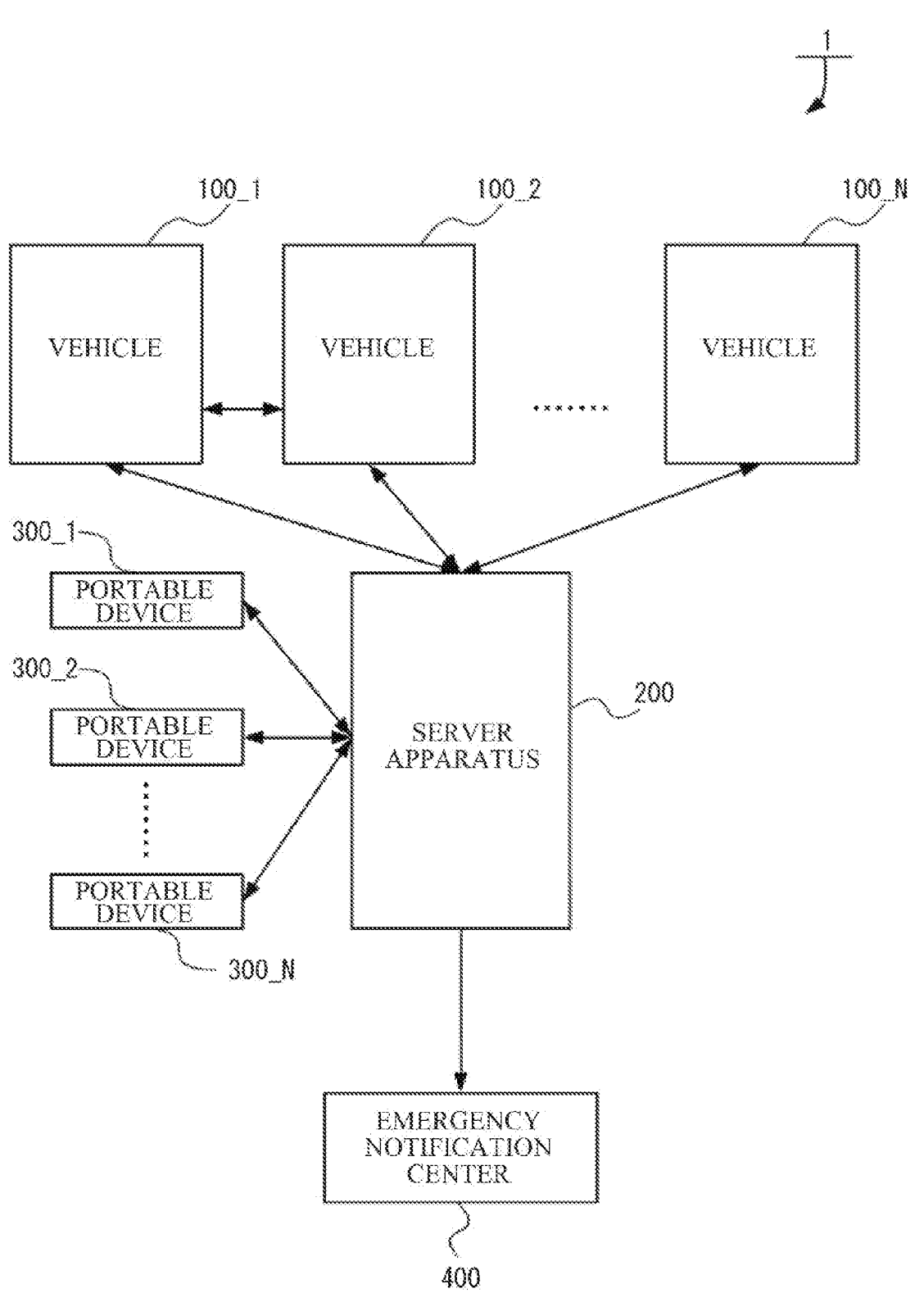
FIG. 1 is an exemplary configuration of an emergency notification system including a server apparatus according to one example embodiment of the disclosure.

As described in JP-A No. 2010-244167, when an accident involving vehicles has occurred, information about details of the accident is to be provided to an emergency notification center.

Further, in a possible measure against a case where an own vehicle is in an uncommunicable state when an accident involving multiple vehicles and multiple people has occurred, another vehicle is to send an emergency notification in place of the own vehicle, as described in JP-A No. 2001-93069.

However, although being able to cause the other vehicle to send a rescue request in place of the own vehicle in the uncommunicable state, the technique described in JP-A No. 2001-93069 fails to utilize image data and sound data relevant to the accident owned by the vehicle in the uncommunicable state. There is therefore still room for improvement in providing information on details of the accident to the emergency notification center.

It is desirable to provide a server apparatus that secures smooth and rapid transmission of accurate information on details of an accident involving multiple vehicles and multiple people upon occurrence of the accident.

Example Embodiment

In the following, a server apparatus 200 according to an example embodiment of the disclosure is described with reference to FIGS. 1 to 11.

The following description of the server apparatus 200 according to the example embodiment is given with reference to an exemplary configuration of an emergency notification system 1.

Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

<Exemplary Configuration of Emergency Notification System 1>

As illustrated in FIG. 1, the emergency notification system 1 according to the example embodiment includes vehicles 100_1 to 100_N, the server apparatus 200, portable devices 300_1 to 300_N, and an emergency notification center 400.

The vehicles 100_1 to 100_N are peripheral vehicles including vehicles involved in the accident, and are communicable with the server apparatus 200 to be described later. Hereinafter, the vehicles 100_1 to 100_N are each referred to as a peripheral vehicle 100 or collectively referred to as peripheral vehicles 100 when the vehicles 100_1 to 100_N are not to be distinguished from each other.

In the example embodiment, the vehicle 100 sends accident information to the server apparatus 200 upon the occurrence of an accident. Examples of the accident information may include data on the state of contact, data on a contact portion, images, and sounds that are stored in a memory of the vehicle 100.

The server apparatus 200 collects the accident information from the vehicles 100 and the portable devices 300_1 to 300_N. In the example embodiment, when a vehicle without an emergency notification system is included in the vehicles involved in the accident, the server apparatus 200 collects the accident information by sending a request for the accident information not only to the other vehicles 100 involved in the accident and the portable devices 300_1 to 300_N in the peripheral area of the site of the accident but also to the vehicles 100 and the portable devices 300_1 to 300_N present within a specific area from the site of the accident.

The portable devices 300_1 to 300_N may include not only portable devices owned by drivers of the vehicles involved in the accident but also the portable devices present in the peripheral area of the site of the accident, and the portable devices present in the specific area from the site of the accident. Hereinafter, the portable devices 300_1 to 300_N are each referred to as a portable device 300 or collectively referred to as portable devices 300 when the portable devices 300_1 to 300_N are not to be distinguished from each other.

The portable devices 300 may be, for example, smartphones and wearable devices.

The portable device 300 may provide the accident information, such as static image data, moving image data, or sound data relevant to the accident, in response to the request from the server apparatus 200.

Further, the portable device 300 may permit the server apparatus 200 to search the portable device 300 for social media information, image data, or sound data stored in the portable device 300.

The emergency notification center 400 may receive notification information form the server apparatus 200, and may notify a person in charge of the accident information. When receiving the accident information, the person in charge may send a notification to a fire station, a police station, or a hospital selected based on the details of the accident.

<Exemplary Configuration of Vehicle 100>

Figure 2:
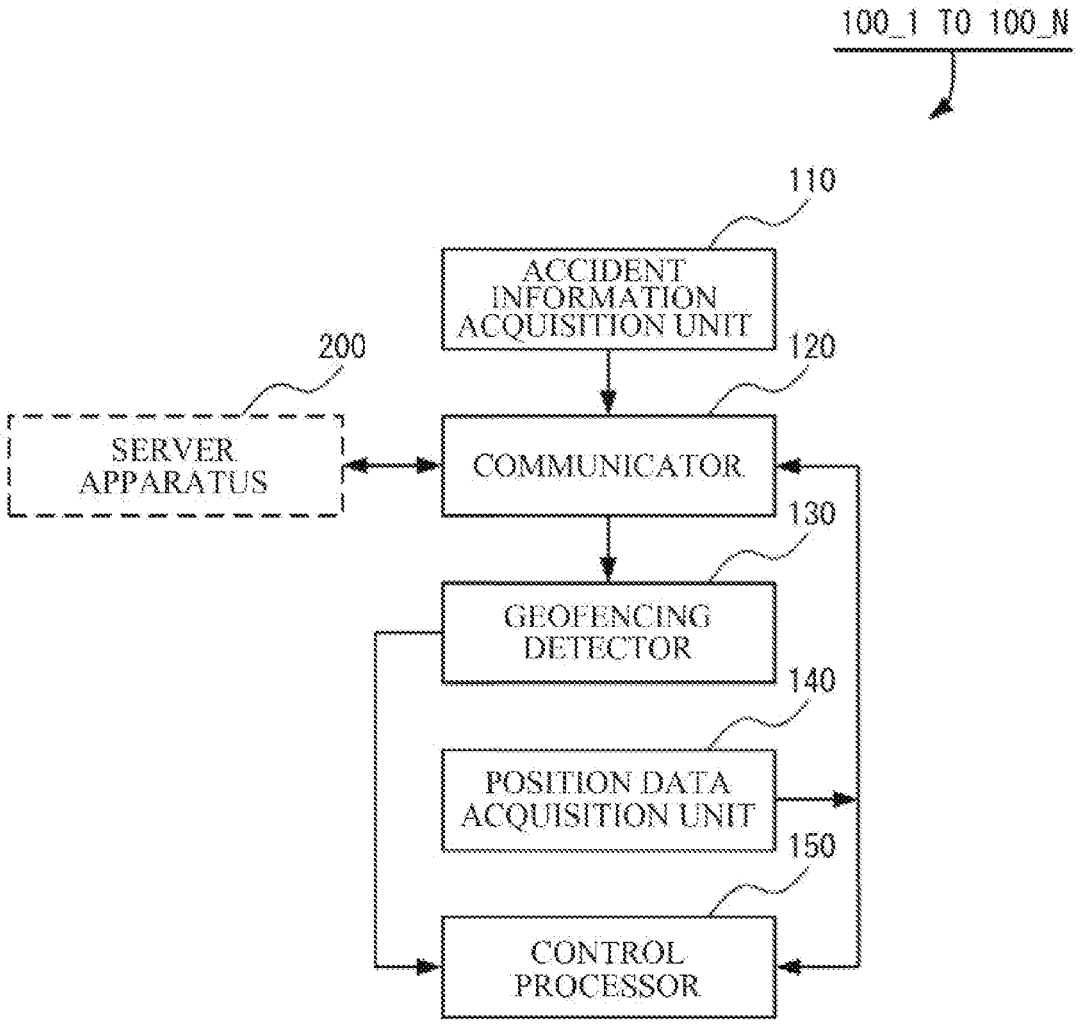
FIG. 2 is a block diagram illustrating an exemplary configuration of a vehicle according to one example embodiment of the disclosure.

As illustrated in FIG. 2, the vehicles 100_1 to 100_N according to the example embodiment may each include an accident information acquisition unit 110, a communicator 120, a geofencing detector 130, a position data acquisition unit 140, and a control processor 150.

The accident information acquisition unit 110 may acquire, as the accident information, image data acquired by an imaging device of an advanced driver-assistance system (ADAS), image data of a peripheral environment of the vehicle 100 acquired by a dashboard camera of the vehicle 100, or sound data collected by microphones of the vehicles 100 for example.

The communicator 120 may be a communication module that communicates with the server apparatus 200, for example.

The communication may be established by a communication method such as Wi-Fi (registered trademark), for example.

The communicator 120 may send the accident information acquired by the accident information acquisition unit 110 in response to the request for the accident information from the server apparatus 200, for example.

Further, the communicator 120 may send a control signal, received from a base station 500, for enabling a geofencing operation to the geofencing detector 130 to be described later, and may send own vehicle position data acquired by the position data acquisition unit 140 to be described later to the server apparatus 200.

The geofencing detector 130 may transmit the control signal for enabling the geofencing operation received from the base station 500 via the communicator 120, and may notify the control processor 150 to be described later of the transmission of the control signal.

When the geofencing operation is enabled, the position data acquisition unit 140 may acquire the own vehicle position data from a navigation system, for example.

The position data acquisition unit 140 may send the own vehicle position data acquired from the navigation system to the server apparatus 200.

The control processor 150 may control an overall operation of the vehicle 100 in accordance with a control program stored in a non-illustrated read only memory (ROM), for example.

In the example embodiment, the control processor 150 may perform control to send the accident information acquired by the accident information acquisition unit 110 and the own vehicle position data acquired by the position data acquisition unit 140 to the server apparatus 200 in response to the request for the accident information from the server apparatus 200, for example.

<Exemplary Configuration of Server Apparatus 200>

Figure 3:
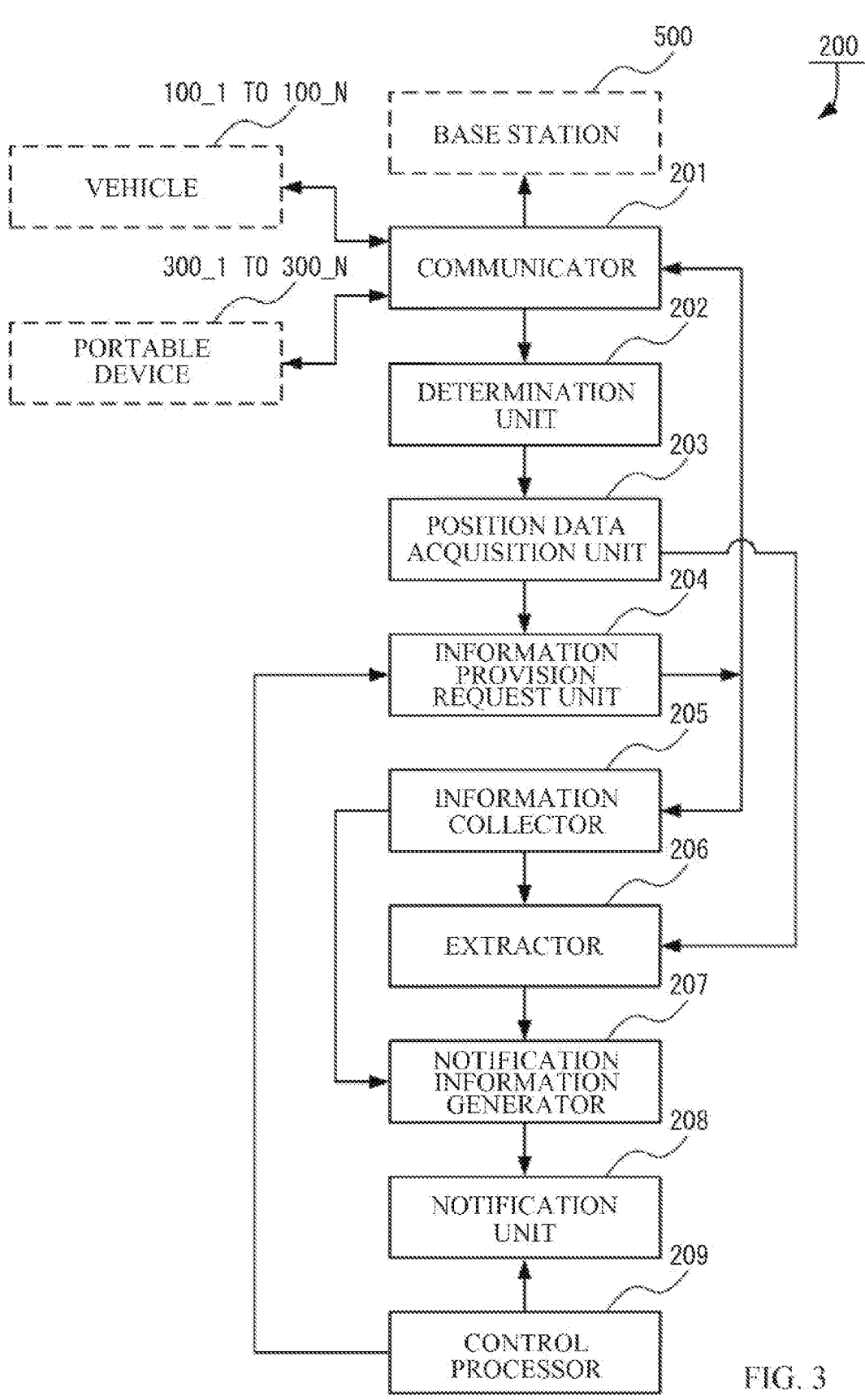
FIG. 3 is a block diagram illustrating an exemplary configuration of a server apparatus according to one example embodiment of the disclosure.

As illustrated in FIG. 3, the server apparatus 200 according to the example embodiment may include a communicator 201, a determination unit 202, a position data acquisition unit 203, an information provision request unit 204, an information collector 205, an extractor 206, a notification information generator 207, a notification unit 208, and a control processor 209.

The communicator 201 may be a communication module that communicates with the peripheral vehicles 100, including the vehicles involved in the accident, and the portable devices 300 present in the peripheral area of the site of an accident upon the occurrence of the accident, for example.

The communication may be established by a communication method such as Wi-Fi (registered trademark), for example.

In one example, the communicator 120 may be activated in response to a control signal from the control processor 209, and may receive the accident information from the peripheral vehicles 100, including the vehicles involved in the accident, and the portable devices 300 present in the peripheral area of the site of the accident.

Note that the communicator 120 may sequentially send the accident information received from the vehicles 100 and the portable devices 300 present in the peripheral area of the site of the accident to the information collector 205 to be described later.

The determination unit 202 may determine whether a vehicle without the emergency notification system is included in the vehicles involved in the accident, based on image data received from the vehicles 100, including the vehicles involved in the accident, the portable devices 300 present in the peripheral area of the site of the accident.

In one example, the determination unit 202 may retrieve information on the license plate of a vehicle involved in the accident from the image data included in the accident information acquired by the communicator 201. The determination unit 202 may access a server of the District Land Transport Bureau or a server of the Ministry of Land, Infrastructure and Transport to determine whether the vehicle includes the emergency notification system.

Alternatively, the determination unit 202 may retrieve the information on the license plate of the vehicle involved in the accident from image data acquired by monitoring cameras disposed on roads.

When the determination unit 202 determines that the vehicle without the emergency notification system is included, the position data acquisition unit 203 may acquire position data on a position of a vehicle having issued an emergency notification out of the vehicles involved in the accident.

The position data acquired by the position data acquisition unit 203 may be sent to the information provision request unit 204 to be described later.

The information provision request unit 204 requests, via the communicator 201, a base station 500 covering an area including the acquired position to send an information provision request to the vehicles 100 or the portable devices 300 present in a set target area.

The information collector 205 collects the accident information from the peripheral vehicles 100, including the vehicles involved in the accident, or the portable devices 300 present in the peripheral area of the site of the accident, and collects information from the vehicles 100 or the portable devices 300 present in the set target area.

Note that the information collected by the information collector 205 from the vehicles 100 and the portable devices 300 present in the set target area may be sent to the extractor 206 to be described later, and the accident information collected by the information collector 205 from the peripheral vehicles 100, including the vehicles involved in the accident, or the portable devices 300 present in the peripheral area of the site of the accident may be sent to the notification information generator 207.

The extractor 206 may extract accident information from the information collected by the information collector 205 based on the position data included in the information received from the vehicles 100 or the portable devices 300 present in the set target area.

Note that the accident information extracted by the extractor 206 may be sent to the notification information generator 207 to be described later.

The notification information generator 207 may sort out the accident information received from the peripheral vehicles 100, including the vehicles involved in the accident, or the portable devices 300_1 to 300_N present in the peripheral area of the site of the accident, and the accident information extracted by the extractor 206, to generate notification information.

Herein, the term "sort out" may encompass excluding the same accident information from the accident information received from the peripheral vehicles, including the vehicles involved in the accident, or the portable devices 300 present in the peripheral area of the site of the accident, and the accident information extracted by the extractor 206, and combining multiple pieces of accident information to enhance the accuracy of the information on the number of vehicles involved in the accident or the number of injured people, for example.

The notification information generated by the notification information generator 207 may be sent to the notification unit 208 to be described later.

The notification unit 208 may notify the emergency notification center 400 of the notification information generated by the notification information generator 207.

The control processor 209 may control an overall operation of the server apparatus 200 in accordance with a control program stored in a non-illustrated read only memory (ROM), for example.

In the example embodiment, the control processor 209 may perform control to cause the information provision request unit 204 to send the information provision request to the base station 500.

The control processor 209 may further perform control to cause the notification unit 208 to send the notification information to the emergency notification center 400.

<Exemplary Configuration of Portable Device 300>

Figure 4:
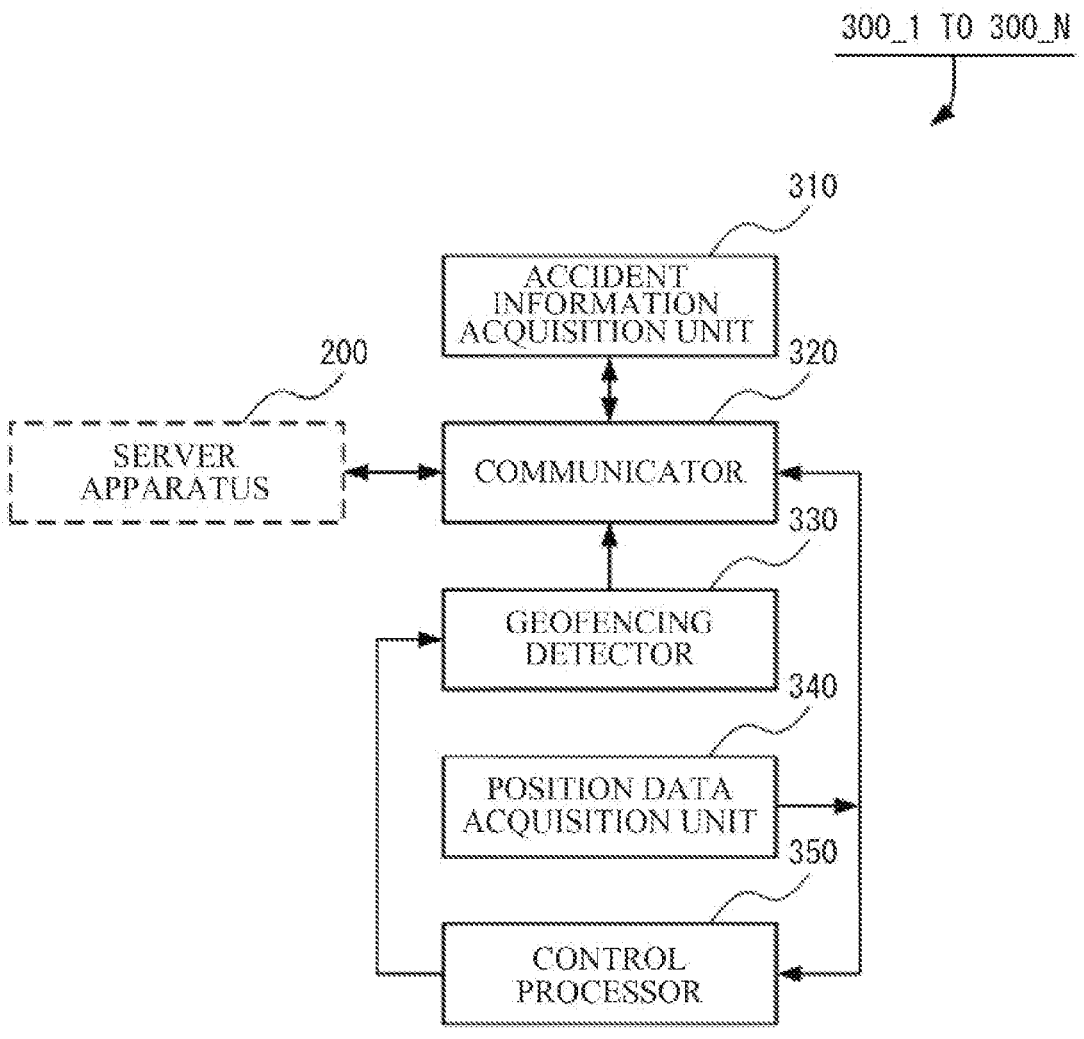
FIG. 4 is a block diagram illustrating an exemplary configuration of a portable device according to one example embodiment of the disclosure.

As illustrated in FIG. 4, the portable devices 300_1 to 300_N according to the example embodiment may each include an accident information acquisition unit 310, a communicator 320, a geofencing detector 330, a position data acquisition unit 340, and a control processor 350.

The accident information acquisition unit 310 may acquire, for example, image data acquired by an imaging device and sound data collected by a microphone as the accident information.

The communicator 320 may be a communication module to communicate with the server apparatus 200, for example.

The communication may be established by a communication method such as Wi-Fi (registered trademark), for example.

The communicator 320 may send the accident information acquired by the accident information acquisition unit 310 in response to the request for the accident information from the server apparatus 200, for example.

Further, the communicator 320 may send a control signal, received from the base station 500, for enabling the geofencing operation to the geofencing detector 330 to be described later, and may send own vehicle position data acquired by the position data acquisition unit 340 to be described later to the server apparatus 200.

The geofencing detector 330 may transmit the control signal for enabling the geofencing operation received from the base station 500 via the communicator 320, and may notify the control processor 350 to be described later of the transmission of the control signal.

When the geofencing operation is enabled, the position data acquisition unit 340 may acquire data on a current position from the global positioning system (GPS), for example.

The position data acquisition unit 340 may send the data on the current position to the server apparatus 200.

The control processor 350 may control an overall operation of the portable device 300 in accordance with a control program stored in a non-illustrated read only memory (ROM), for example.

In the example embodiment, the control processor 350 may send the accident information acquired by the accident information acquisition unit 310 and the data on the current position acquired by the position data acquisition unit 340 to the server apparatus 200 in response to a request from the server apparatus 200 to send the accident information, for example.

<Process in Serve Apparatus 200>

Figure 5:
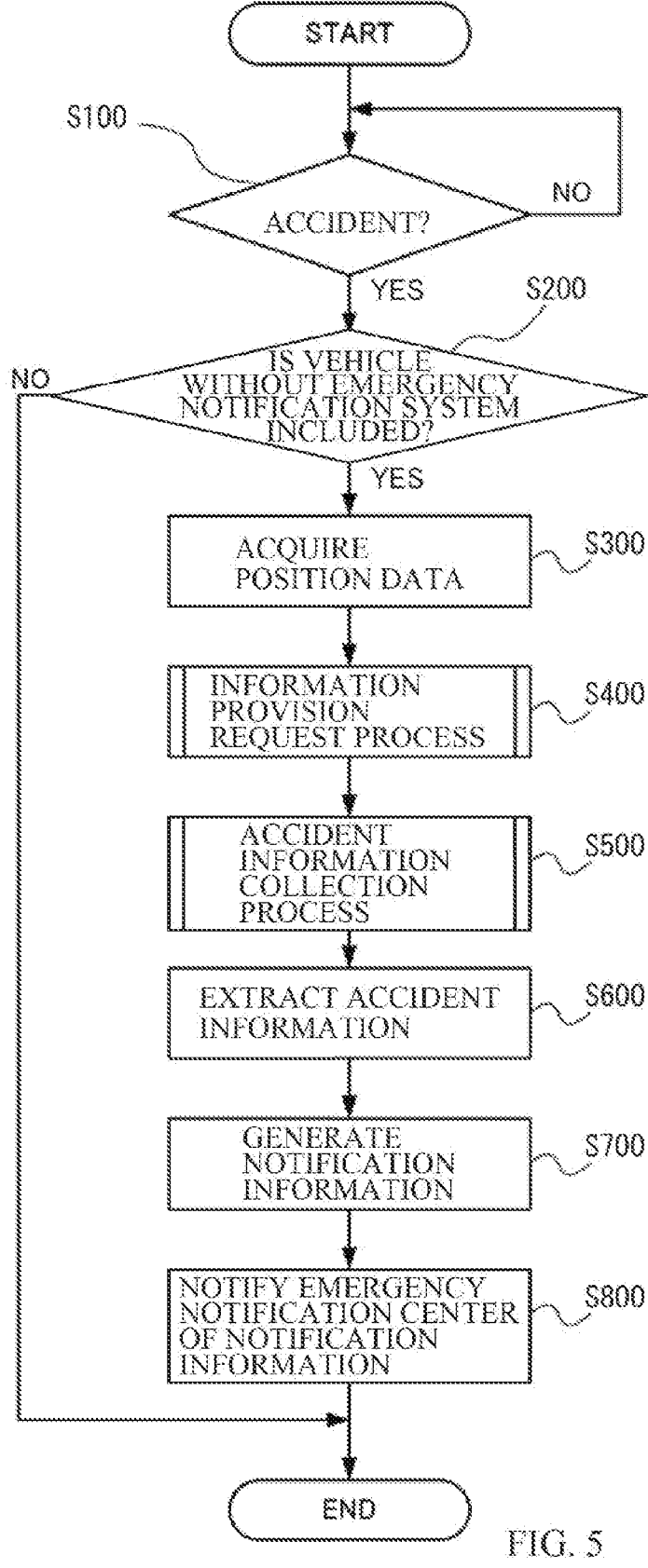
FIG. 5 is a flowchart of an exemplary process to be performed by the server apparatus according to one example embodiment of the disclosure.

With reference to FIG. 5, a description is given of a process to be performed by the server apparatus 200 according to the example embodiment.

As illustrated in FIG. 5, the control processor 209 may determine whether an accident has occurred (Step S100).

When the control processor 209 determines that no accident has occurred (Step S100: NO), the process may return to a stand-by mode.

In contrast, when the control processor 209 determines that an accident has occurred (Step S100: YES), the determination unit 202 may determine whether the vehicle without the emergency notification system is included in the vehicles involved in the accident, based on the image data received from the peripheral vehicles 100, including the vehicle involved in the accident, or devices including the portable devices 300 present in the peripheral area of the site of the accident (Step S200).

If the determination unit 202 determines that the vehicle without the emergency notification system is not included based on the image data received from the peripheral vehicles 100, including the vehicles involved in the accident, or the devices including the portable devices 300 present in the peripheral area of the site of the accident (Step S200: NO), the process may end.

In contrast, if the determination unit 202 determines that the vehicle without the emergency notification system is included based on the image data received from the peripheral vehicles 100, including the vehicles involved in the accident, or the devices including the portable devices 300 present in the peripheral area of the site of the accident (Step S200: YES), the position data acquisition unit 203 may acquire the position data on the position of the vehicle having issued the emergency notification out of the vehicles 100 involved in the accident (Step S300).

Thereafter, the information provision request unit 204 may request, via the communicator 201, the base station 500 covering the area including the acquired position to send the information provision request to the vehicles 100 or the portable devices 300 present in the set target area (i.e., an information provision request process) (Step S400).

Note that the information provision request process will be described in detail later.

The information collector 205 may acquire the accident information from the peripheral vehicles 100, including the vehicles involved in the accident, or the portable devices 300 present in the peripheral area of the site of the accident, and may collect the information from the vehicles 100 and the portable devices 300 present in the set target area (i.e., an accident information collection process) (Step S500).

Note that the accident information collection process will be described in detail later.

The extractor 206 may extract accident information from the information collected by the information collector 205 from the vehicles 100 or the portable devices 300 present in the set target area, based on the position data included in the information received from the vehicles 100 or and the portable devices 300 present in the set target area (Step S600).

The notification information generator 207 may sort out the accident information collected by the information collector 205 from the peripheral vehicles 100, including the vehicles involved in the accident, or the portable devices 300 present in the peripheral area of the site of the accident and the accident information extracted by the extractor 206, to thereby generate the notification information (Step S700).

The notification unit 208 may notify the emergency notification center 400 of the notification information generated by the notification information generator 207, following which the process may end (Step S800).

<Information Provision Request Process>

Figure 6:
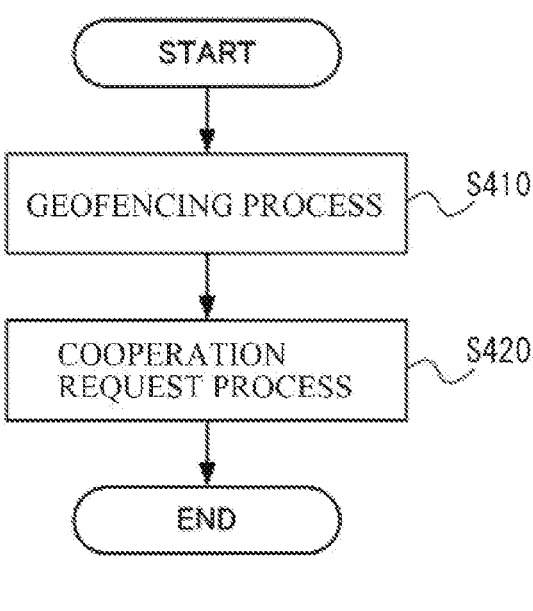
FIG. 6 is a flowchart of an information provision request process to be performed by the server apparatus according to one example embodiment of the disclosure.

The information provision request process will now be described with reference to FIGS. 6 to 8. As illustrated in FIG. 6, the information provision request process may include a geofencing process (Step S410) and a cooperation request process (Step S420).

Figure 7:
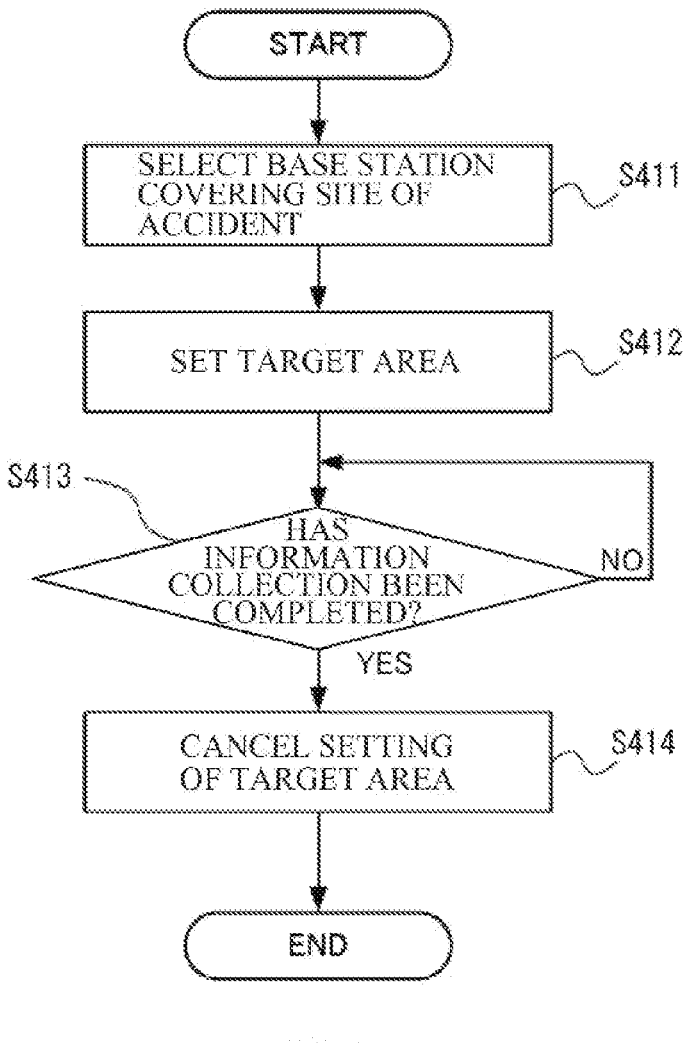
FIG. 7 is a flowchart of a geofencing process to be performed by the server apparatus according to one example embodiment of the disclosure.

As illustrated in FIG. 7, the geofencing process may start with Step S411 in which the server apparatus 200 selects the base station 500 covering the site of the accident based on the position data, acquired by emergency notification position data acquisition unit 203, on the vehicle having issued the emergency notification out of the vehicles 100 involved in the accident.

Thereafter, the server apparatus 200 may set the target area, and the information provision request unit 204 may request, via the communicator 120, the base station 500 covering the area including the acquired position to send the information provision request to the vehicles 100 or the portable devices 300 present in the set target area (Step S412).

The server apparatus 200 may determine whether the information collector 205 has completed the process of collecting the information from the vehicles 100 or the portable devices 300 present in the set target area has been completed (Step S413). If the server apparatus 200 determines that the information collector 205 has not completed the process of collecting the information form the vehicles 100 and the portable devices 300 present in the set target area (Step S413: NO), the process may return to the stand-by mode.

In contrast, if it is determined that the information collector 205 has completed the process of collecting the information from the vehicles 100 and the portable devices 300 present in the set target area (Step S413: YES), the server apparatus 200 may cancel the setting of the target area, following which the process may end (Step S413).

Figure 8:
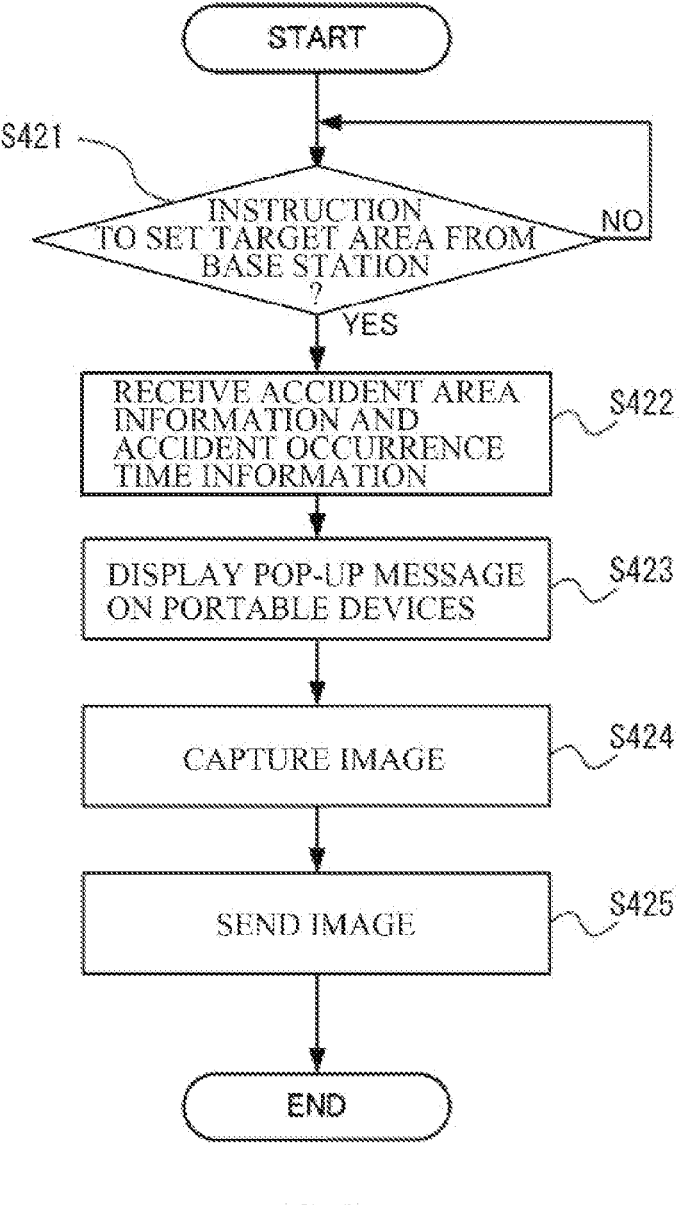
FIG. 8 is a flowchart of a cooperation request process to be performed by the server apparatus according to one example embodiment of the disclosure.

As illustrated in FIG. 8, the cooperation request process may start with Step S421 in which the control processor 350 of the portable device 300 present in the set target area may determine whether an instruction to set the target area (i.e., a geofencing signal) has been received from the base station 500. If the geofencing detector 330 of the portable device 300 has not detected the geofencing signal sent from the base station 500 (Step S421: NO), the control processor 350 of the portable device 300 may return the process to a stand-by mode.

In contrast, if the geofencing detector 330 of the portable device 300 has detected the geofencing signal sent from the base station 500 (Step S421: YES), the communicator 320 of the portable device 300 may receive accident area information and accident occurrence time information from the base station 500, and may send the information to the control processor 350 of the portable device 300 (Step S422).

The base station 500 may send a pop-up message requesting for cooperation in information provision to the portable devices 300. The control processor 350 of the portable device 300 may display the pop-up message on a non-illustrated display part thereof (Step S423).

The owner of the portable device 300 may cause a non-illustrated imaging device to capture an image of a peripheral environment, and may send data on the captured image to the communicator 320 (Step S424).

The communicator 320 may send the data on the captured image received from the portable device 300 to the server apparatus 200, following which the process may end (Step S425).

<Accident Information Collection Process>

The accident information collection process will now be described with reference to FIGS. 9 to 11.

Figure 9:
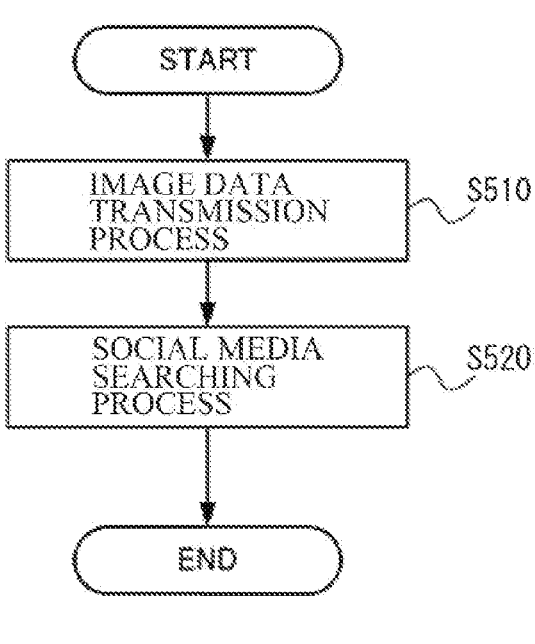
FIG. 9 is a flowchart of an accident information collection process to be performed by the server apparatus according to one example embodiment of the disclosure.

As illustrated in FIG. 9, the accident information collection process may include an image data transmission process (Step S510) and a social media searching process (Step S520).

Figure 10:
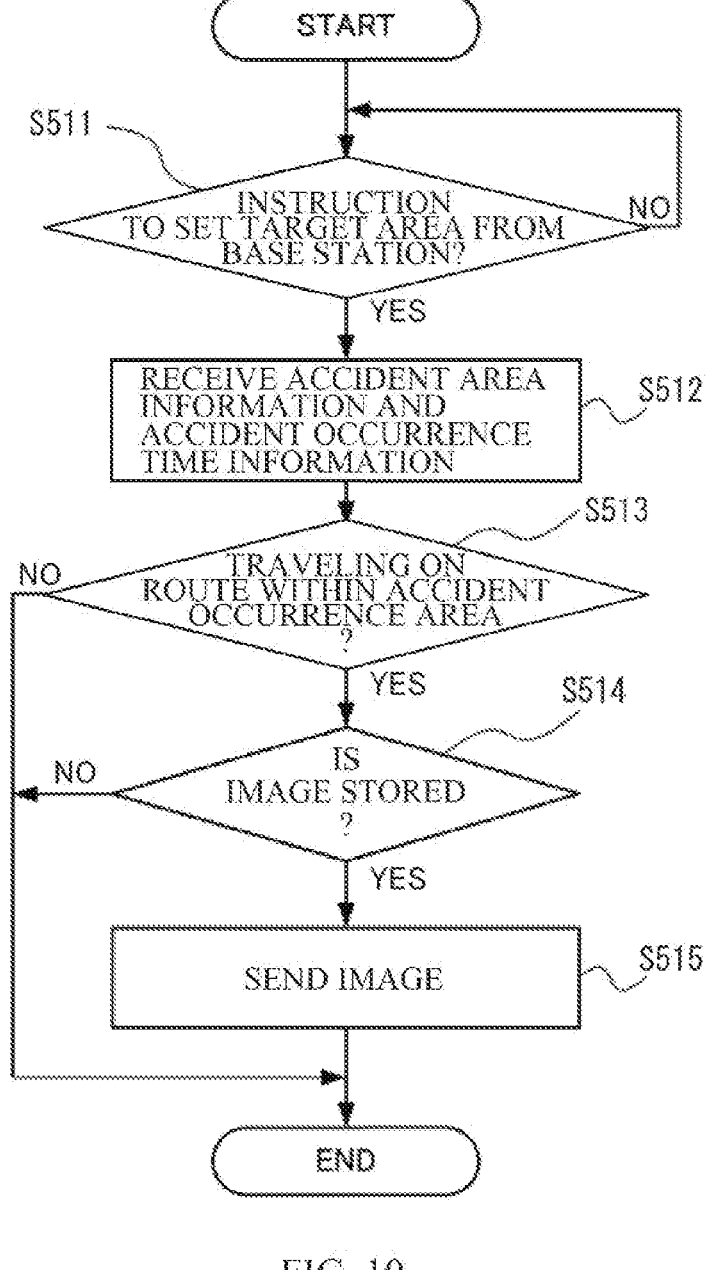
FIG. 10 is a flowchart of an image data transmission process of sending image data to the server apparatus during traveling of the vehicle according to one example embodiment of the disclosure.

As illustrated in FIG. 10, the image data transmission process may start with Step S511 in which the control processor 150 of the vehicle 100 present in the set target area determines whether the instruction to set the target area (i.e., the geofencing signal) has been received from the base station 500. If the geofencing detector 130 of the vehicle 100 has not detected the geofencing signal sent from the base station 500 (Step S511: NO), the control processor 150 of the vehicle 100 may return the process to a stand-by mode.

In contrast, if the geofencing detector 130 of the vehicle 100 has detected the geofencing signal sent from the base station 500 (Step S511: YES), the communicator 120 of the vehicle 100 may receive the accident area information and the accident occurrence time information from the base station 500, and may send the information to the control processor 150 of the vehicle 100 (Step S512).

The control processor 150 of the vehicle 100 may determine whether the vehicle 100 is traveling on a route within the accident occurrence area based on information received from a non-illustrated navigation system (Step S513). If it is determined that the vehicle 100 is not traveling on the route within the accident occurrence area (Step S513: NO), the control processor 150 may end the process.

In contrast, if it is determined that the vehicle 100 is traveling on the route within the accident occurrence area (Step S513: YES), the control processor 150 may determine whether an image captured during traveling on the route is stored (Step S514). If it is determined that the image captured during traveling on the route is not stored (Step S514: NO), the control processor 150 of the vehicle 100 may end the process.

In contrast, if it is determined that the image captured during traveling on the route is stored (Step S514: YES), the control processor 150 of the vehicle 100 may send the stored image to the server apparatus 200 via the communicator 320 (Step S515), following which the process may end.

Figure 11:
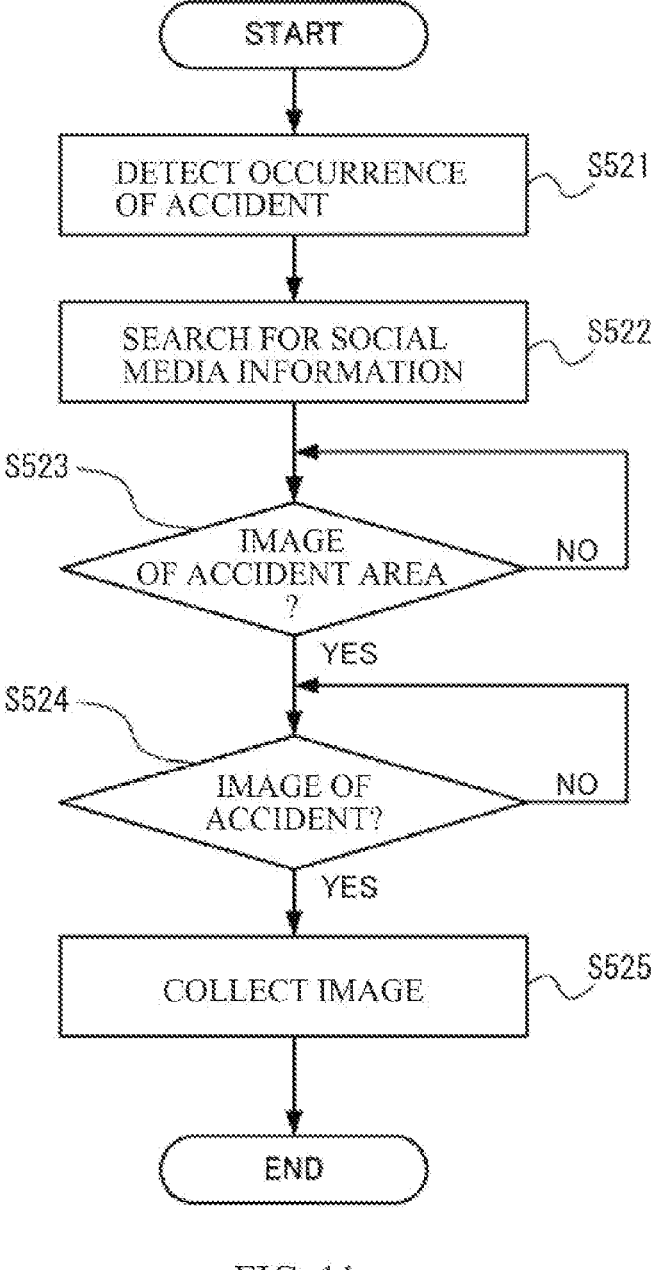
FIG. 11 is a flowchart of a social media searching process to be performed by the server apparatus according to one example embodiment of the disclosure to retrieve and collect image data from the portable device.

As illustrated in FIG. 11, the social media searching process may start with Step S521 in which the control processor 209 of the server apparatus 200 detects the occurrence of an accident. When detecting the occurrence of the accident, the control processor 209 of the server apparatus 200 may search the portable devices 300 present in the set target area for social media information (Step S522).

Through the search, the control processor 209 of the server apparatus 200 may determine whether the portable devices 300 present in the set target area include social media information including images of the set target area (Step S523). If it is determined as a result of the search that the portable devices 300 include no social media information including the images of the set target area (Step S523: NO), the control processor 209 of the server apparatus 200 may repeat the search.

In contrast, if it is determined as a result of the search that the portable devices 300 include the social media information including the images of the set target area (Step S523: YES), the control processor 209 of the server apparatus 200 may determine whether an image of the accident is included in the social media information (Step S524). If it is determined that the image of the accident is not included (Step S524: NO), the control processor 209 may repeat the searching.

In contrast, if it is determined that the image of the accident is included (Step S524: YES), the control processor 209 of the server apparatus 200 may collect the image of the accident (Step S525), following which the process may end.

<Workings and Effects>

As described above, the determination unit 202 of the server apparatus 200 according to the example embodiment determines whether a vehicle without the emergency notification system is included in the vehicles involved in an accident based on the image data received from the peripheral vehicles 100, including the vehicles involved in the accident, or the portable devices 300 present in the peripheral area of the site of the accident. If the vehicle without the emergency notification system is included, the position data acquisition unit 203 acquires the position data on the position of the vehicle having issued the emergency notification out of the vehicles involved in the accident. Thereafter, the information provision request unit 204 requests the base station 500 covering the area including the acquired position to send the information provision request to the vehicles 100 or the portable devices 300 present in the set target area.

That is, if the vehicle without the emergency notification system is included in the vehicles involved in the accident, the position data acquisition unit 203 acquires the position data on the position of the vehicle having issued the emergency notification out of the vehicles involved in the accident, and the information provision request unit 204 requests the base station 500 covering the area including the acquired position to send the information provision information to the vehicles 100 or the portable devices 300 present in the set target area.

If the vehicle without the emergency notification system is included in the vehicles involved in the accident, there may be cases where details of the accident are not recognized only based on the emergency notification information collected from the other vehicles involved in the accident. However, according to the example embodiment, the position data acquisition unit 203 of the server apparatus 200 acquires the position data on the position of the vehicle having issued the emergency notification out of the vehicles involved in the accident, and the information provision request unit 204 requests the base station 500 covering the area including the acquired position to send the information provision request to the vehicles 100 or the portable devices 300 present in the set target area. This enables smooth and rapid transmission of accurate information on details of an accident upon the occurrence of the accident involving multiple vehicles and multiple people.

In addition, the information collector 205 collects the accident information from the peripheral vehicles 100, including the vehicles involved in the accident, or the portable devices 300 present in the peripheral area of the site of the accident, and collects the information from the vehicles 100 or the portable devices 300 present in the set target area.

It is therefore possible to collect the information in a sufficient amount enough to compensate the lack of information on the accident. This enables smooth and rapid transmission of accurate information on details of an accident upon the occurrence of the accident involving multiple vehicles and multiple people.

Further, the extractor 206 extracts the accident information from the collected information based on the position data included in the information received from the vehicles 100 or the portable devices 300 present in the set target area.

It is therefore possible to acquire accurate information on details of the accident. This enables smooth and rapid transmission of accurate information on details of an accident upon the occurrence of the accident involving multiple vehicles and multiple people.

Further, according to the server apparatus 200 of the example embodiment, the accident information may include the social media information.

That is, the accident information may include social media information obtained by the server apparatus 200 searching the portable devices 300 and social media information obtained by the server apparatus 200 performing web searching based on a keyword.

Accordingly, it is possible to acquire information on social media posts posted by people who were in the site of the accident immediately after the occurrence of the accident but left from the site of the accident. This enlarges the area from which information on the accident is obtainable.

It is therefore possible to collect the information in a sufficient amount enough to compensate the lack of information on the accident. This enables smooth and rapid transmission of accurate information on details of an accident upon the occurrence of the accident involving multiple vehicles and multiple people.

Further, the notification information generator 207 of the server apparatus 200 according to the example embodiment may sort out the accident information collected from the peripheral vehicles, including the vehicles involved in the accident, or the portable devices present in the peripheral area of the site of the accident and the accident information extracted by the extractor 206.

Herein, the sorting out of the collected information by the notification information generator 207 may encompass excluding the same accident information from the accident information received from the peripheral vehicles, including the vehicles involved in the accident, or the portable devices in the peripheral area of the site of the accident, and the accident information extracted by the extractor 206, and combining multiple pieces of accident information to enhance the accuracy of the information on the number of vehicles involved in the accident or the number of injured people, for example.

Accordingly, it is possible to secure rapid and accurate information transmission upon the occurrence of an accident involving multiple vehicles and multiple people.

Modification Example 1

In the example embodiment described above, the determination unit 202 may determine whether a vehicle without the emergency notification system is included in the vehicles involved in the accident based on the image data received from the peripheral vehicles 100_1 to 100_N, including the vehicles involved in the accident, and the portable devices 300 present in the peripheral area of the site of the accident. Alternatively, the determination unit 202 may determine whether a vehicle without a communication system is included in the vehicles involved in the accident.

Note that it is possible to implement the server apparatus 200 of the example embodiment of the disclosure by recording the process to be executed by the information provision request unit 204 and the control processor 209 on a non-transitory recording medium readable by a computer system, and causing the computer system to load the program recorded on the non-transitory recording medium onto the information provision request unit 204 and the control processor 209 to execute the program. The computer system as used herein may encompass an operating system (OS) and hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

One or more of the determination unit 202, the position data acquisition unit 203, the information provision request unit 204, the information collector 205, the extractor 206, and the notification unit 208 in FIG. 3 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the determination unit 202, the position data acquisition unit 203, the information provision request unit 204, the information collector 205, the extractor 206, and the notification unit 208. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the determination unit 202, the position data acquisition unit 203, the information provision request unit 204, the information collector 205, the extractor 206, and the notification unit 208 in FIG. 3.

The invention claimed is:

1. A server apparatus comprising:
a communicator configured to, upon occurrence of an accident involving multiple vehicles, communicate with peripheral vehicles or portable devices present in a peripheral area of a site of the accident, the peripheral vehicles including the multiple vehicles involved in the accident;
a determination unit configured to determine, based on image data received from the peripheral vehicles or the portable devices, whether a first vehicle that lacks an emergency notification system is included in the multiple vehicles involved in the accident;
a position data acquisition unit configured, in response to determining that the first vehicle that lacks the emergency notification system is included, to acquire first position data indicating a position of a second vehicle, which has issued an emergency notification, included in the multiple vehicles;
an information provision request unit configured to request a base station covering an area including the position indicated by the acquired first position data to send an information provision request to vehicles or portable devices present in a set target area;
an information collector configured to:
collect first accident information from the peripheral vehicles or the portable devices present in the peripheral area; and
collect information from the vehicles or the portable devices present in the set target area;
an extractor configured to extract second accident information from the information collected from the vehicles or the portable devices present in the set target area based on second position data included in the information collected from the vehicles or the portable devices present in the set target area; and
a notification unit configured to notify an emergency notification center of at least one of the first accident information collected by the information collector or the second accident information extracted by the extractor, as notification information.

2. The server apparatus according to claim 1, wherein the first accident information collected by the information collector or the second accident information extracted by the extractor includes social media information.

3. The server apparatus according to claim 2, further comprising a notification information generator configured to sort out the first accident information collected form the peripheral vehicles or the portable devices in the peripheral area and the second accident information extracted by the extractor to generate the notification information.

4. The server apparatus according to claim 1, further comprising a notification information generator configured to sort out the first accident information collected form the peripheral vehicles or the portable devices in the peripheral area and the second accident information extracted by the extractor to generate the notification information.

5. The server apparatus according to claim 1, wherein the extractor is configured to exclude information whose included second position data indicates a position outside the set target area.

6. The server apparatus according to claim 1, further comprising a notification information generator configured to sort out the first accident information and the second accident information to generate notification information, wherein sorting out includes excluding the same accident information and combining multiple pieces of accident information to enhance accuracy of information on at least one of a number of vehicles involved in the accident and a number of injured people.

7. The server apparatus according to claim 1, wherein the determination unit is configured to retrieve information on a license plate of a vehicle involved in the accident from the image data and, by accessing a registration server, determine whether the vehicle includes the emergency notification system.

8. The server apparatus according to claim 1, wherein the information provision request unit is configured to request a base station covering an area including the position indicated by the acquired first position data to send an information provision request to vehicles or portable devices present in a set target area, the base station being configured to transmit a geofencing signal including accident area information and accident occurrence time information to the vehicles or the portable devices in the set target area, and wherein the extractor is configured to extract the second accident information based on second position data included in the collected information.

9. The server apparatus according to claim 1, The server apparatus of claim 1, wherein the determination unit is configured to retrieve information on a license plate of a vehicle involved in the accident from the image data and, by accessing a registration server, determine whether the vehicle includes the emergency notification system.

10. A server apparatus comprising:

a communicator configured to, upon occurrence of an accident involving multiple vehicles, communicate with peripheral vehicles or portable devices present in a peripheral area of a site of the accident, the peripheral vehicles including the multiple vehicles involved in the accident; and circuitry configured to:

determine, based on image data received from the peripheral vehicles or the portable devices, whether a first vehicle that lacks an emergency notification system is included in the multiple vehicles involved in the accident;

acquire, in response to determining that the first vehicle that lacks the emergency notification system is included, first position data indicating a position of a second vehicle, which has issued an emergency notification, included in the multiple vehicles;

request a base station covering an area including the position indicated by the acquired first position data to send an information provision request to vehicles or portable devices present in a set target area;

collect first accident information from the peripheral vehicles or the portable devices present in the peripheral area;

collect information from the vehicles or the portable devices present in the set target area;

extract second accident information from the information collected from the vehicles or the portable devices present in the set target area based on second position data included in the information collected from the vehicles or the portable devices present in the set target area; and notify an emergency notification center of at least one of the first accident information collected or the second accident information extracted, as notification information.

\* \* \* \* \*